United States Patent
McDade et al.

(10) Patent No.: US 9,365,346 B2
(45) Date of Patent: Jun. 14, 2016

(54) LIFT MECHANISM FOR ROLL-OUT WASTE BIN AND METHOD

(71) Applicant: SCHAEFER SYSTEMS INTERNATIONAL, INC., Charlotte, NC (US)

(72) Inventors: Clinton Lawrence McDade, Charlotte, NC (US); Michael Daniel Lewis, Charlotte, NC (US)

(73) Assignee: Schaefer Systems International, Inc., Charlotte, NC (US)

( * ) Notice: Subject to any disclaimer, the term of this patent is extended or adjusted under 35 U.S.C. 154(b) by 0 days.

(21) Appl. No.: 14/572,921

(22) Filed: Dec. 17, 2014

(65) Prior Publication Data
US 2016/0068339 A1   Mar. 10, 2016

Related U.S. Application Data

(63) Continuation-in-part of application No. 14/478,659, filed on Sep. 5, 2014.

(51) Int. Cl.
*B65F 1/12* (2006.01)
*B65F 1/14* (2006.01)
*B62B 5/06* (2006.01)

(52) U.S. Cl.
CPC . *B65F 1/122* (2013.01); *B62B 5/06* (2013.01); *B65F 1/1452* (2013.01)

(58) Field of Classification Search
CPC .............. B65F 1/04; B65F 1/06; B65F 1/122; B65F 1/14; B65F 1/1452; B65F 1/1468; B65F 1/1473; B65F 1/16; B65F 1/1615; B65F 1/22; B65F 2210/183; B65F 2220/12; B65F 2250/11; B29C 33/0033; B29C 41/003; B29C 41/06; B29C 41/40; Y10S 220/908

USPC .............. 220/23.87, 318, 324, 675, 756–757, 220/759, 761–762, 770–771, 833, 908, 220/908.1; 280/47.26; D34/1, 5, 27
See application file for complete search history.

(56) References Cited

U.S. PATENT DOCUMENTS

| | | | | | |
|---|---|---|---|---|---|
| 5,582,322 | A | * | 12/1996 | Prout | B29C 33/0033 220/771 |
| 7,100,791 | B2 | * | 9/2006 | Berger | B65F 1/122 220/380 |
| 7,172,088 | B2 | * | 2/2007 | McDade | B65F 1/04 220/23.87 |
| 7,350,999 | B2 | * | 4/2008 | Brletich | B65F 1/122 403/10 |
| 8,141,455 | B2 | * | 3/2012 | Ogburn | B62B 5/06 74/551.8 |
| 8,146,774 | B2 | * | 4/2012 | Parker | B65F 1/122 220/751 |
| 8,430,267 | B2 | * | 4/2013 | Kilduff | B65F 1/122 220/751 |
| 2008/0093436 | A1 | * | 4/2008 | Bolhous | G06Q 30/04 235/375 |
| 2011/0049152 | A1 | * | 3/2011 | Raghunathan | B65F 1/1468 220/263 |
| 2013/0067868 | A1 | * | 3/2013 | Daudelin | B65F 1/06 53/473 |

* cited by examiner

*Primary Examiner* — J. Gregory Pickett
*Assistant Examiner* — Brijesh V. Patel
(74) *Attorney, Agent, or Firm* — Shumaker, Loop & Kendrick LLP

(57) ABSTRACT

A roll-out waste bin includes a retention bar that is held in place on the bin by a pair of retention bar housings. A rib in one of the retention bar housings engages one end of the retention bar and a protrusion on the other end of the retention bar and exterior to both of the retention bars housings positions the retention bar. In another embodiment, protrusions on both ends of the retention bar allow elimination of the rib. In yet another embodiment, multiple protrusions on one end of the retention bar allow positioning of the retention bar.

14 Claims, 17 Drawing Sheets

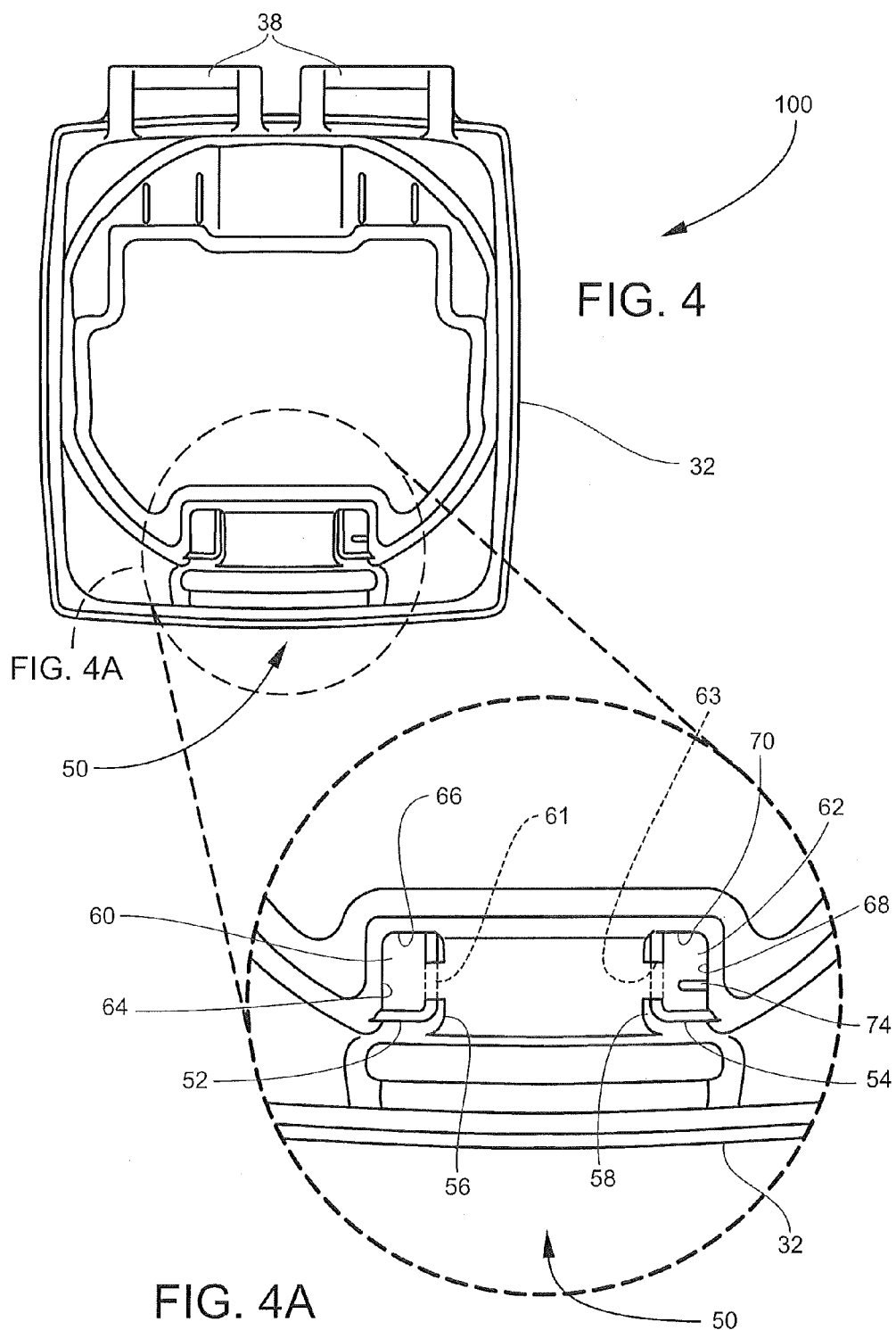

US 9,365,346 B2

LIFT MECHANISM FOR ROLL-OUT WASTE BIN AND METHOD

CROSS REFERENCE TO RELATED PATENT APPLICATION

This application is a continuation-in-part of, expressly incorporated by reference, and claims the benefit of and priority to, co-pending U.S. application Ser. No. 14/478,659, filed Sep. 5, 2014, from which it claims priority.

TECHNICAL FIELD AND BACKGROUND OF THE INVENTION

This application relates to roll-out waste bins, and more particularly to a feature on the exterior of such a roll-out waste bin that permits the bin to be lifted by an automated lifter mounted on a waste disposal truck for emptying into the waste collection hopper of the truck, and then to be lowered back to the ground. Such bins generally include a large receptacle mounted on wheels with a hinged lid for closing the receptacle except during loading or emptying. The front of the bin includes a retention bar which, in conjunction with a downward lip along the front top rim of the waste bin, is gripped by the automated lifter in order to lift and dump the contents of the waste bin. In typical prior art waste bins a retention bar receiving area is provided on the exterior of the waste bin which holds the retention bar. In its most basic form, this receiving area is formed of two parallel, vertical walls, external to the interior volume of the waste bin, set apart at a distance that is less than the length of the retention bar. See FIG. 1. Each of these vertical walls has an aperture, through which the retention bar is placed, with enough clearance to allow the retention bar to spin freely. See FIG. 1A.

Another embodiment of this receiving area has front close-out walls that connect the vertical walls to the waste bin receptacle, thereby creating two retention bar housings, each housing having one vertical wall, one front closeout wall and two external walls of the waste bin receptacle. See FIGS. 2, 2A.

A pair of ribs, one residing inside each of the retention bar housings extends from one of the external walls of the retention bar housings. These ribs trap the retention bar after it has been slid into position through the retention bar housing apertures, preventing the retention bar from moving side-to-side enough to be removed. The ribs are positioned in the retention bar housings to normally interfere with the retention bar and thereby prevent the retention bar from being pulled free of free of the bin. In order to insert the retention bar, these ribs have a suitable degree of flexibility, and are typically bent by the retention bar sufficiently to allow the retention bar to slide past the ribs and enter the retention bar housings, whereupon the ribs spring back into their normal positions, locking the retention bar into the retention bar housings.

This arrangement requires considerable maneuvering to insert the retention bar into both apertures, past the ribs and into the retention bar housings. See FIGS. 3, 3A.

This application discloses several embodiments of retention bars that are easy to install and remain securely in the retention bar housings during use. This application also discloses a method of installing a retention bar according to the several retention bar embodiments into the retention bar housings. In each embodiment, either one rib or no ribs in the retention bar housings are necessary.

SUMMARY OF THE INVENTION

It is therefore an object of the present invention to provide a roll-out waste bin that is provided with a retention bar that is simple to install, and that remains securely positioned in its required position.

It is another object of the invention to provide a roll-out waste bin that is provided with a retention bar that can be inserted and retained on the bin, thereby utilizing simplified retention devices.

It is another object of the invention to provide a roll-out waste bin that is provided with a retention bar that can be inserted and retained on the bin utilizing a rib on one side of the retention bar and other retention means on the other side of the retention bar.

It is another object of the invention to provide a method of installing a retention bar onto a waste bin.

These and other objects and advantages of the invention are achieved by providing a roll-out waste bin of the type characterized by having a receptacle mounted on wheels, a hinged lid enclosing an open top of the receptacle, a handle, a downward lip along a front top rim of the receptacle and a vertically spaced retention bar for being grasped by an external lifter for elevating and emptying the contents from the receptacle. The waste bin also includes first and second laterally spaced-part vertical walls extending outwardly and forwardly from a forward side of the receptacle and positioned to form respective first and second retention bar housings.

A first aperture is formed in the first vertical wall and a second aperture is formed in the second vertical wall for receiving the retention bar. The first and second apertures have diameters sufficiently large to permit free rotation of the retention bar in the first and second apertures.

BRIEF DESCRIPTION OF THE DRAWING FIGURES

The present invention is best understood when the following detailed description of the invention is read with reference to the accompanying drawings, in which:

FIG. 1A is a fragmentary enlarged view of the retention bar area of the waste bin shown in FIG. 1;

FIG. 4 is a top plan view of a waste bin having a retention bar mechanism according to preferred embodiments of the present invention;

FIG. 4A is a fragmentary enlarged view of the novel retention bar mechanism shown in FIG. 4;

FIG. 24A is a fragmentary enlarged view of the retention bar mechanism shown in FIG. 24;

DETAILED DESCRIPTION OF THE PREFERRED EMBODIMENT

Figure 1:
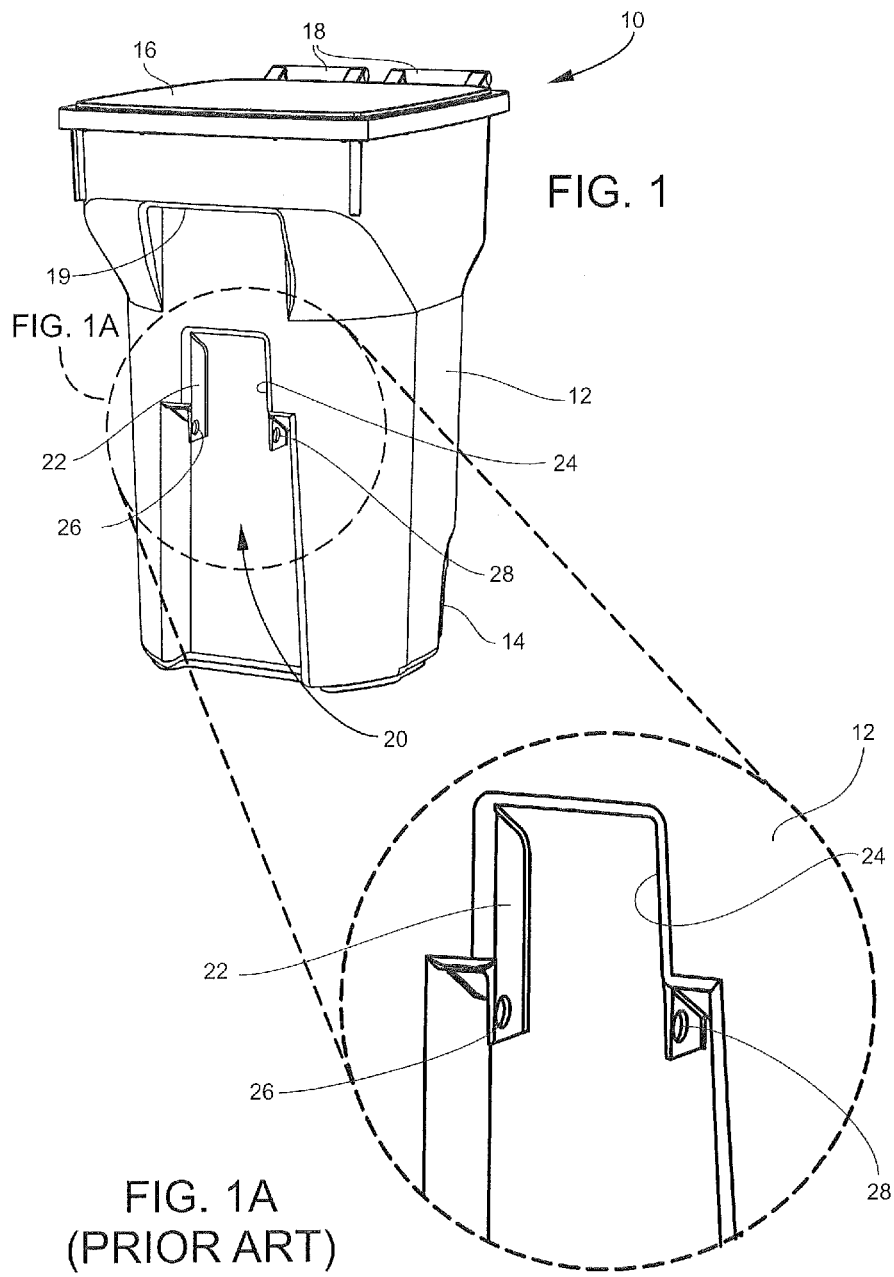
FIG. 1 is a roll-out waste bin according to one prior art design with which the retention bar of the present invention may be utilized.
Figures 2, 2A:
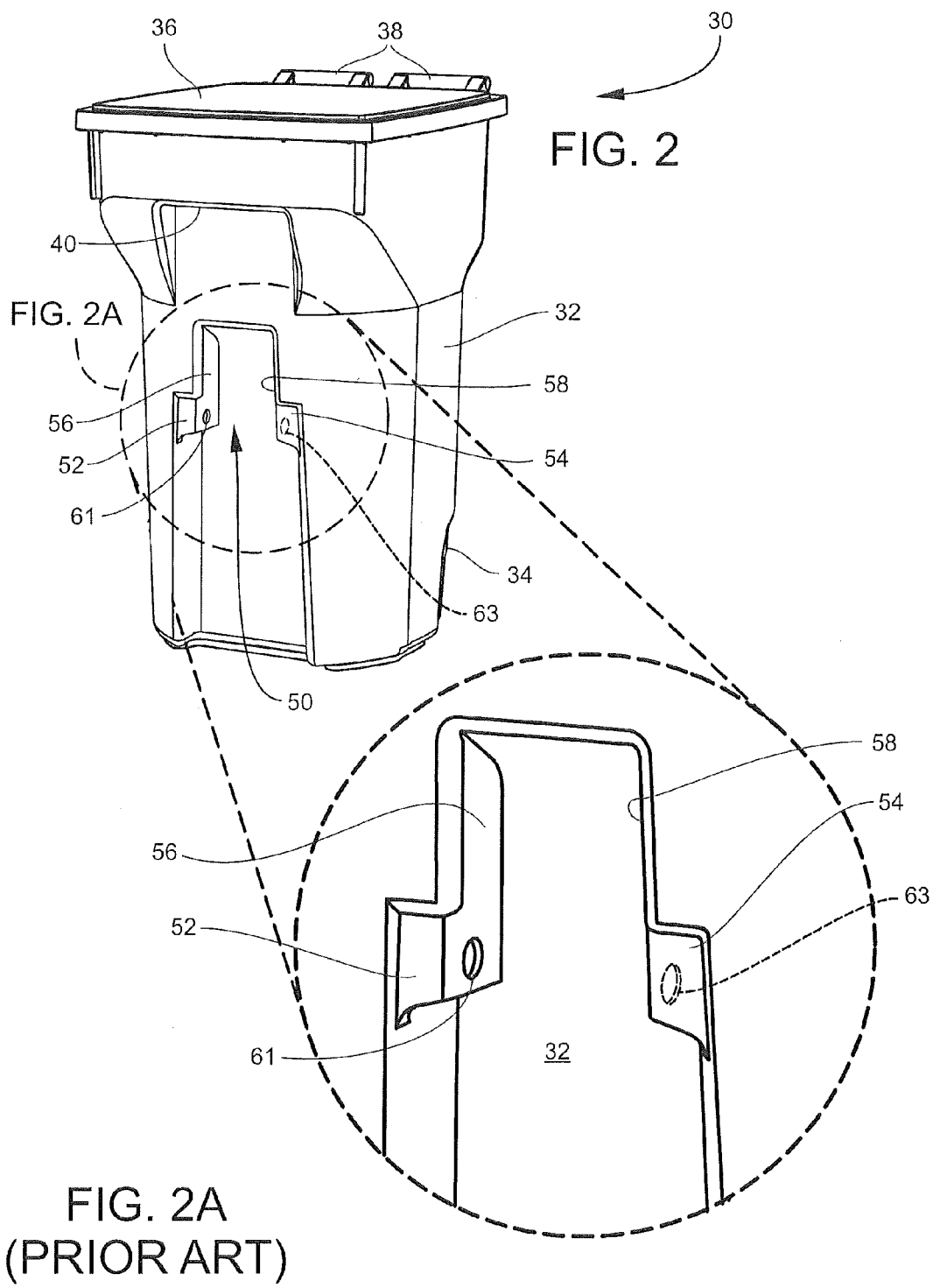
FIG. 2 is a waste bin of a type with which the retention bar of the present invention may be utilized.
FIG. 2A is a fragmentary enlarged view of the retention bar mechanism shown in FIG. 2.

Referring now to the drawings, a roll-out waste bin 10 that includes a prior art retention bar receiving area according to one prior art design is shown in FIGS. 1 and 1A, and includes a waste receptacle 12 mounted on wheels 14, one shown, and covered by a hinged lid 16, with handles 18.

A downwardly-facing lip 19 extends along the front top rim of the waste receptacle 12 and is gripped by the automated lifter in order to lift and dump the contents of the waste bin 10. A retention bar receiving area 20 is formed of two parallel, vertical walls 22, 24 that are external to the interior volume receptacle 12 and spaced apart at a distance that is less than the length of the retention bar, not shown. The vertical walls 22, 24 have respective apertures 26, 28, through which the retention bar is placed, with enough clearance to allow the retention bar to spin freely.

Another waste bin that includes a prior art retention bar receiving area according to another design is shown at reference numeral 30 in FIGS. 2, 2A, 3 and 3A. The waste bin 30 includes a waste receptacle 32 mounted on wheels 34, one shown, and covered by a hinged lid 36, with handles 38 and a downwardly-facing lip 40, as described above. A retention bar receiving area 50 includes front closeout walls 52, 54 that connect vertical walls 56, 58 to the waste bin receptacle 32, thereby creating two retention bar housings 60, 62, see FIG. 3A, each housing 60, 62 having one vertical wall 56, 58, respectively, one front closeout wall 52, 54 respectively, and two external walls 64, 66 and 68, 70, respectively, of the waste bin receptacle 32. Vertical walls 56, 58 include respective opposed retention bar apertures 61, 63.

Figures 3, 3A:
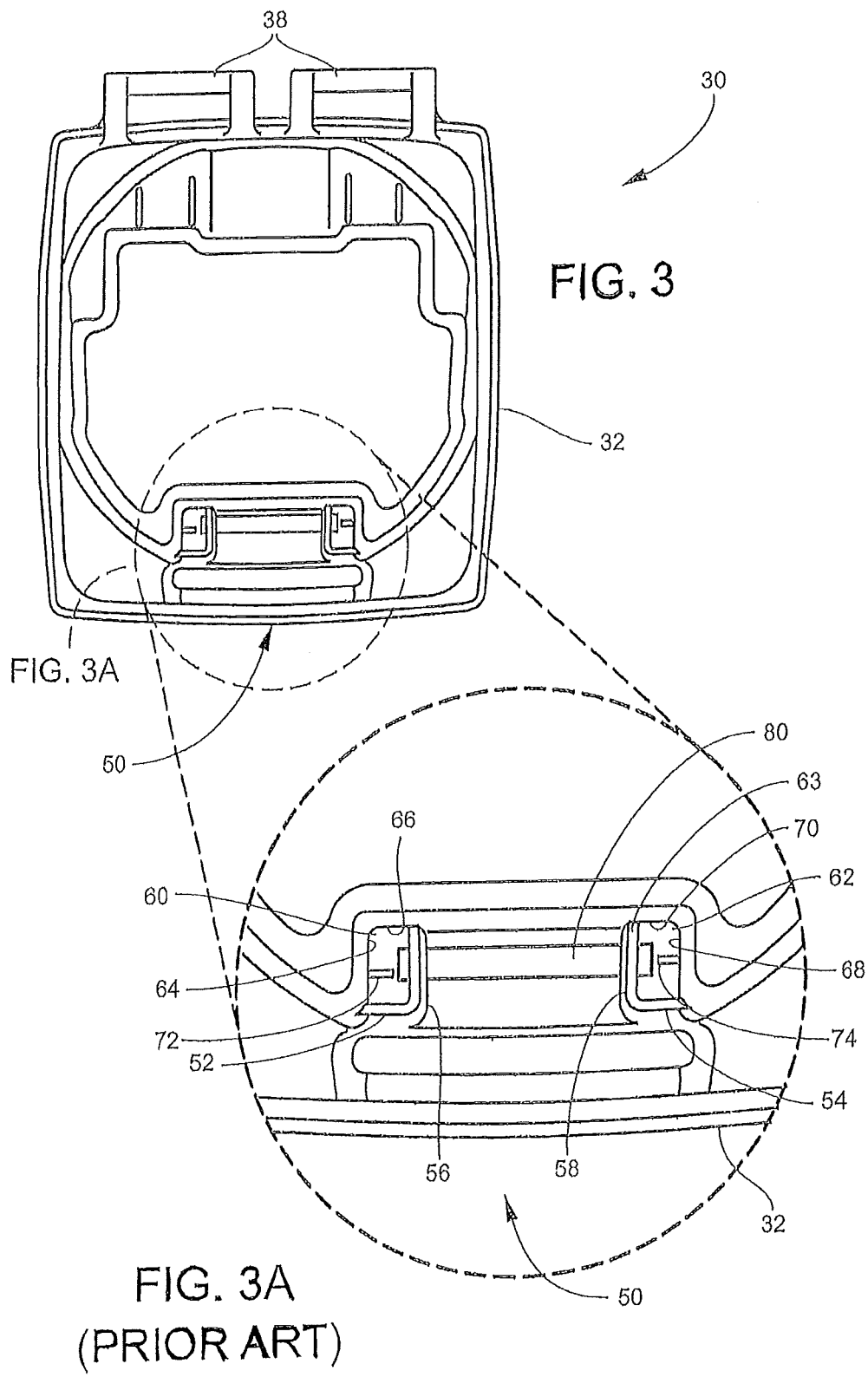
FIG. 3 is a top plan view of the waste bin having a retention bar mechanism according to the prior art design of FIGS. 2 and 2A.
FIG. 3A is a fragmentary enlarged view of the retention bar mechanism shown in FIG. 3.

As best shown in FIG. 3A, a pair of ribs 72, 74, one residing inside each of the retention bar housings 60, 62, respectively, is formed integral to the receptacle 32, and extend from the respective external walls 64, 68 of the retention bar housings 60, 62. These ribs 72, 74, trap the retention bar 80 after it has been slid into position through the retention bar housing apertures, preventing the retention bar from moving side-to-side enough to be removed. The ribs 72, 74 are positioned in the retention bar housings 60, 62 to normally interfere with the retention bar 80 and thereby prevent the retention bar 80 from being pulled free of free of the bin 30. In order to insert the retention bar 80, these ribs 72, 74 have a degree of flexibility, and are typically deflected by the retention bar 80 during insertion sufficiently to allow the retention bar 80 to slide past the ribs 72, 74 and enter the retention bar housings 60, 62, whereupon the ribs 72, 74 move back into their normal positions that interfere with removal of the retention bar 80, locking the retention bar 80 into the retention bar housings 60, 62.

Referring now to FIGS. 4-9, top plan views of a roll-out bin 100 is shown. The bin 100 includes features and elements that are the same as the features and elements of bin 30 and as to those features and elements, the same reference numerals are used. As is illustrated in FIGS. 4-9, the principal difference in the bin 30 and bin 100 is that the rib 72 of the retention bar housing 60 has been omitted in accordance with the novel features described and claimed in this application.

Applicant also notes that the invention of this application is not dependent on the presence of all of the features of the bin 30. The invention is equally usable with reference to bin 10 illustrated in FIGS. 1, 1A, and any other roll-out waste bin having opposed walls into which a retention bar is inserted and retained.

Figure 5:
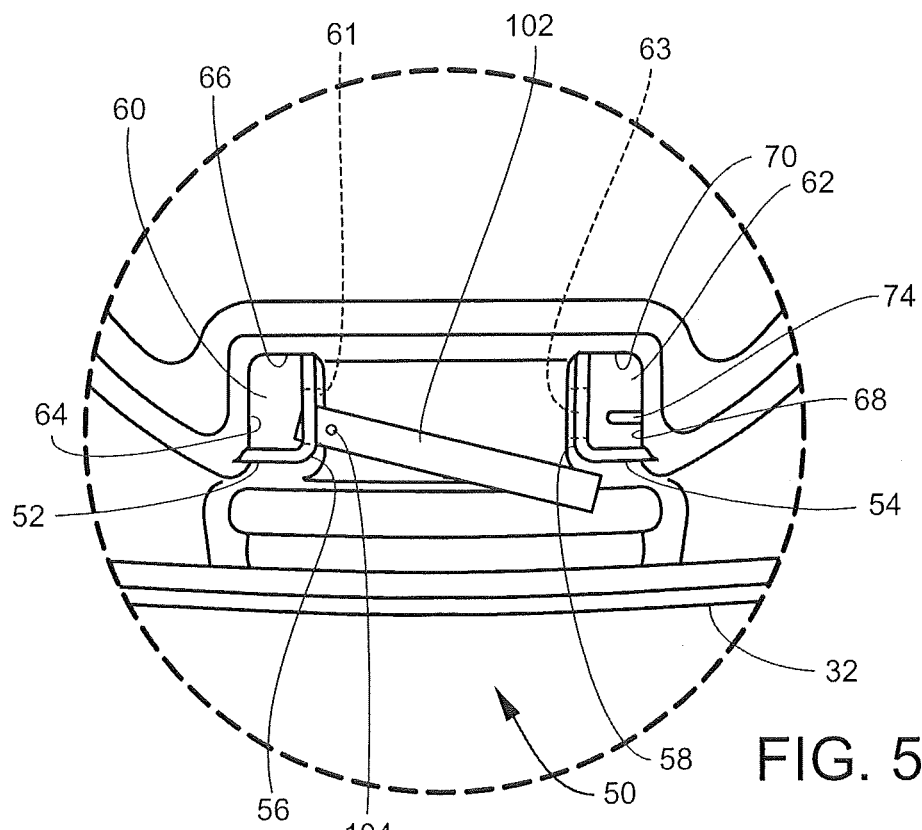
FIGS. 5-11 are fragmentary sequential views of a retention bar according to a preferred embodiment of the present invention being inserted into the retention bar housings of a waste bin of the type shown in FIGS. 4 and 4A.

With these explanations in mind, FIGS. 4-9 illustrate sequentially the insertion of a retention bar 102 in accordance with the method of the invention of this application. As shown in FIG. 5, one end of the retention bar 102 is inserted into the aperture 61 in retention bar housing 60 at an angle necessitated to achieve clearance of the opposing retention bar housing 62 and the vertical wall 58. In accordance with the particular embodiment shown in FIGS. 4-9, a hole 104 is formed in the retention bar 102 proximate one end. The end of the retention bar 102 with this hole 104 is inserted first. The hole 104 is positioned on the retention bar 102 in a location whereby it resides outside the vertical wall 56 of the retention bar housing 62 when insertion of the retention bar 102 is complete. See FIGS. 9-11.

Figure 6:
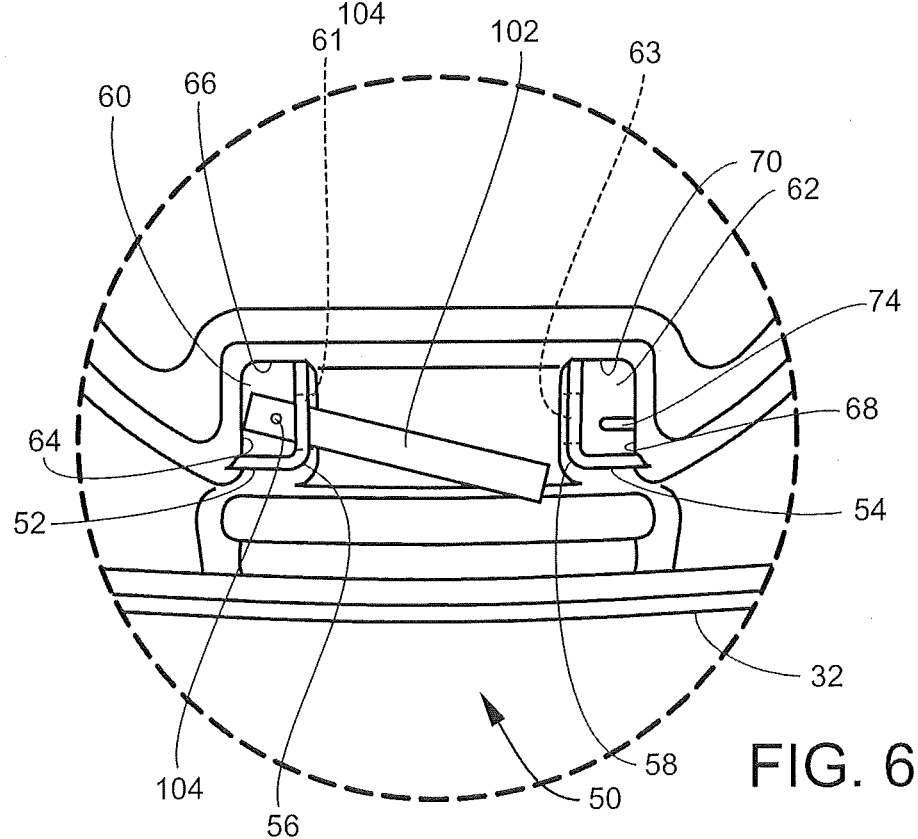
Figure 7:
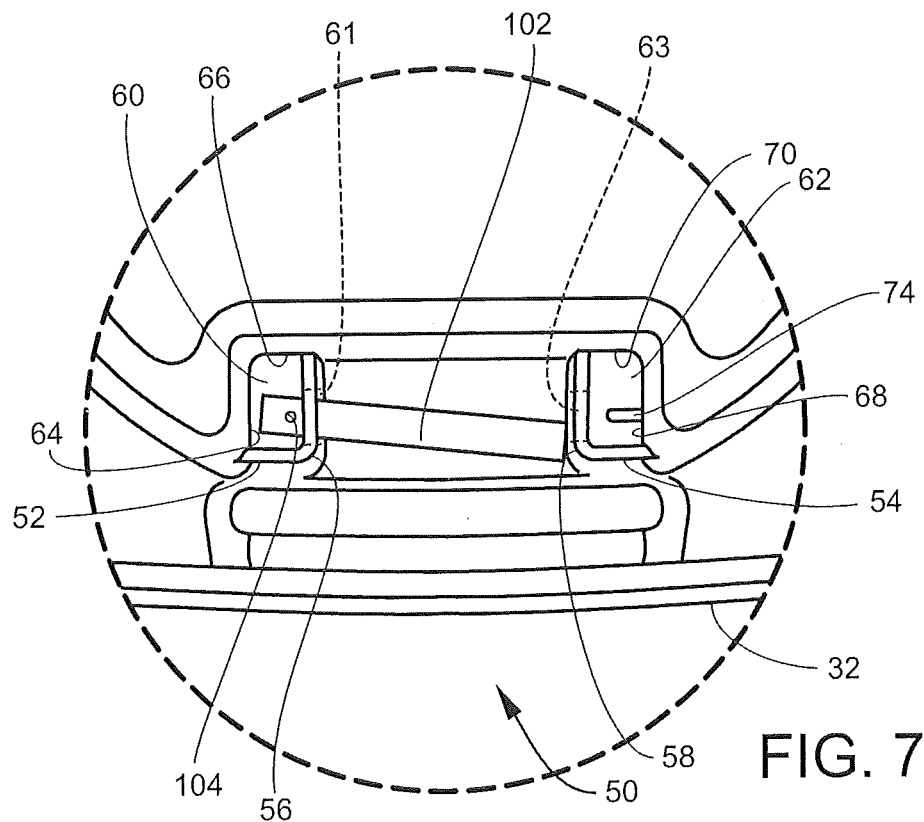
Figure 8:
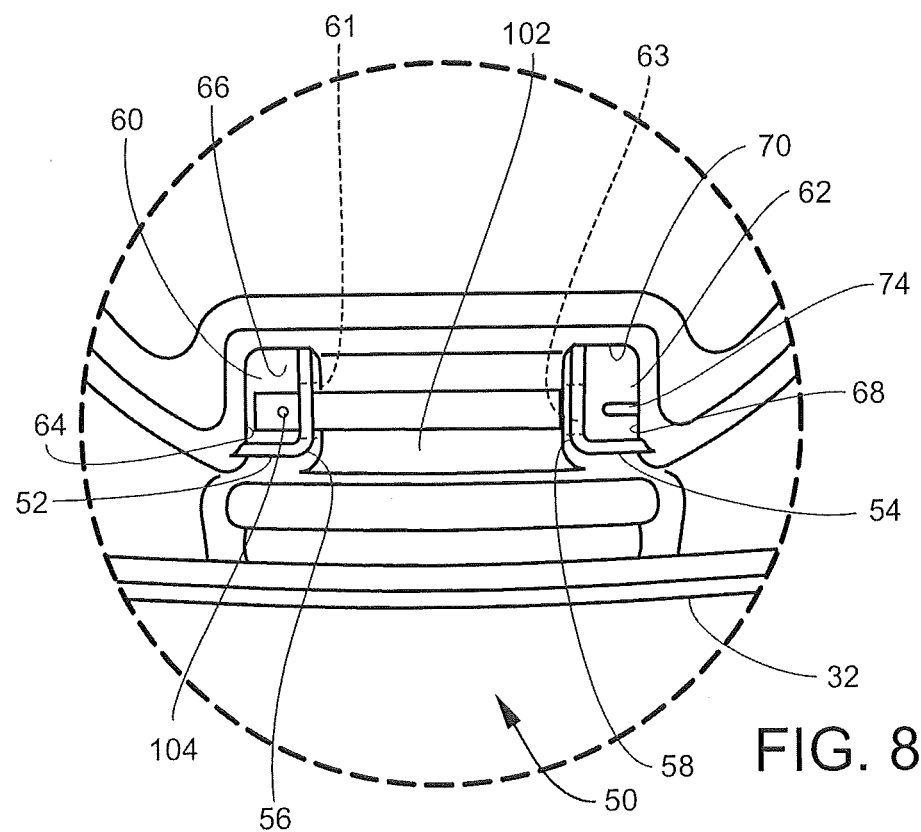
Figure 9:
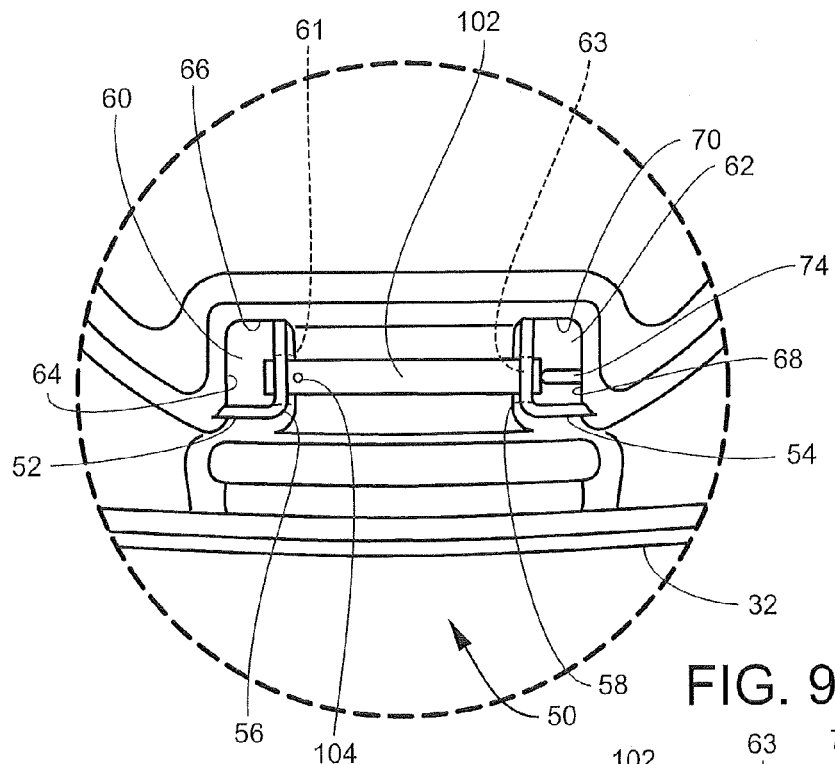

As shown in FIGS. 6-8, when the retention bar 102 is fully extended into the retention bar housing 60, its length is sufficiently short to enable it to clear the vertical wall 58, as shown in FIG. 7. In the position shown in FIG. 8, the retention bar 102 is slid through the aperture 63 in the vertical wall 58 and into the retention bar housing 62 until it is stopped from further insertion by the rib 74. In this position, shown in FIG. 9, the hole 104 resides outside the retention bar housing 60.

Figure 10:
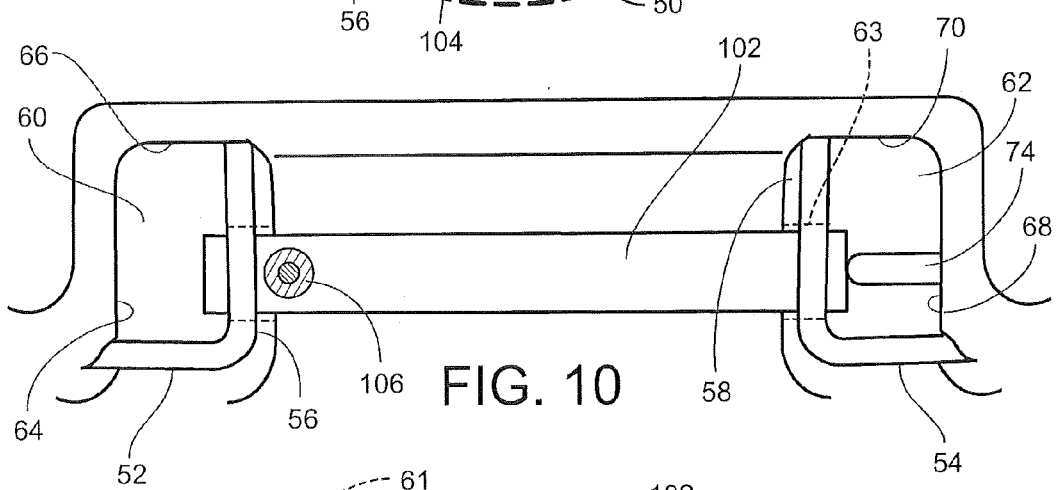
Figure 11:
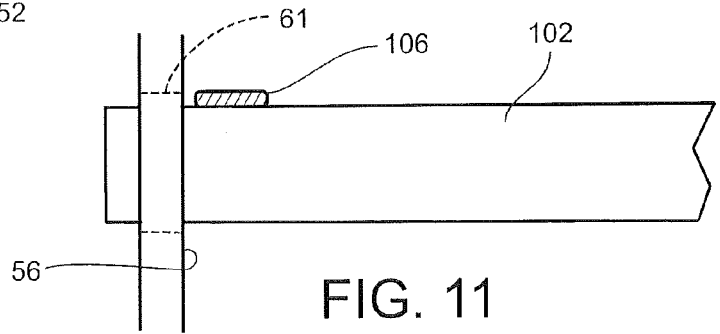
Figure 12:
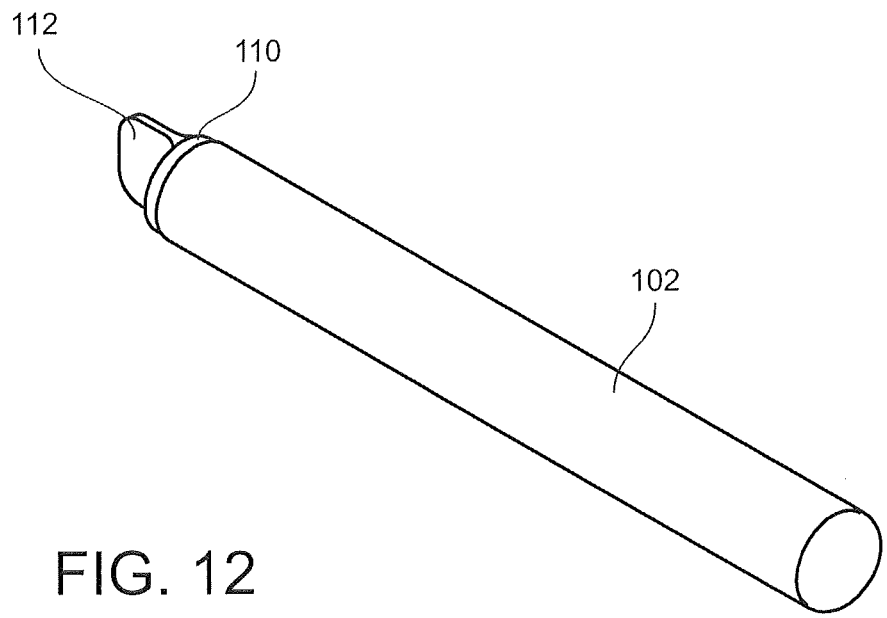
FIGS. 12-17 are fragmentary sequential views of a retention bar according to another preferred embodiment of the present invention being inserted into the retention bar housings of a waste bin of the type shown in FIGS. 4 and 4A.

As shown in FIGS. 10 and 11, a drive rivet 106, is then inserted into the hole 104. The head of the rivet 106 extends sufficiently above the axially-extending surface of the retention bar 102 to interfere with and prevent the retention bar 102 from sliding further back into the retention bar housing 60. This feature in combination with the engagement of the other end of the retention bar 102 with the rib 74 locks the retention bar 102 into the area between the two retention housings 60, 62, while still permitting it to rotate as needed.

Alternative devices may be employed to replace the rivet 106, and may include an end cap on the retention bar 102 having an axially-extending protrusion of such proportion that the protrusion can deform under pressure to allow the placement of the retention bar 102 through the aperture 61 and return to its original shape when said pressure is relieved, with its original shape creating interference with the exterior wall 56 of the retention bar housing 60 that opposes the rib 74.

Figure 13:
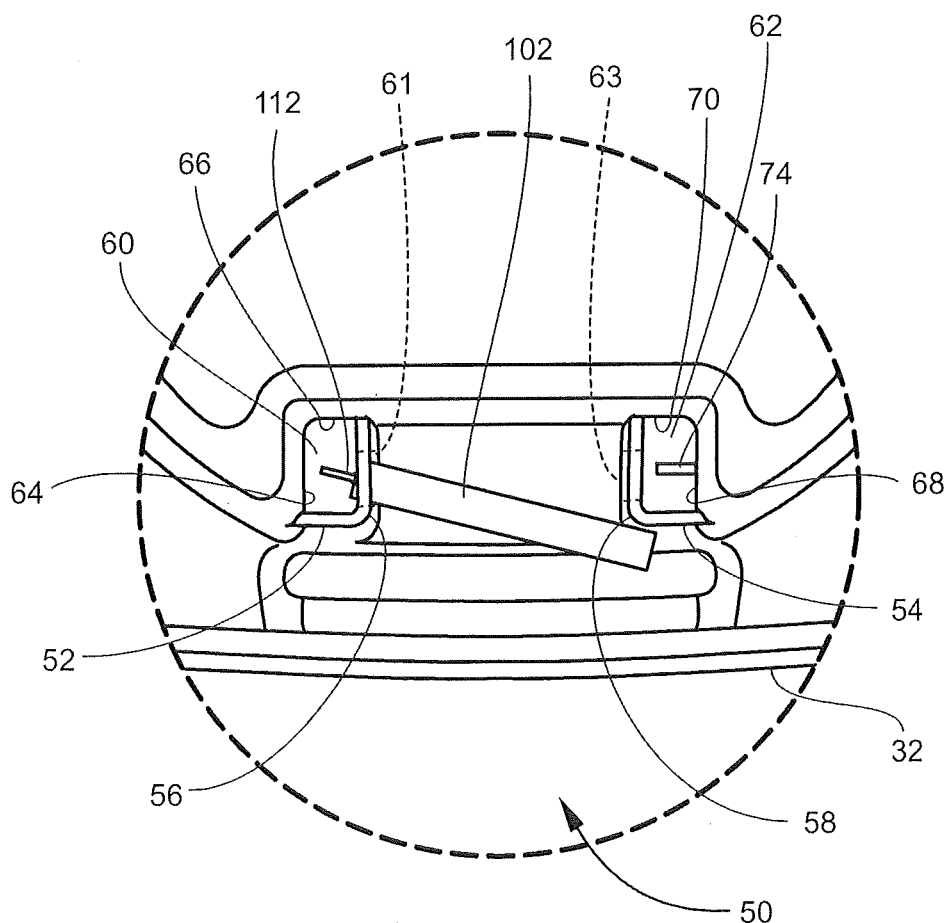
Figure 14:
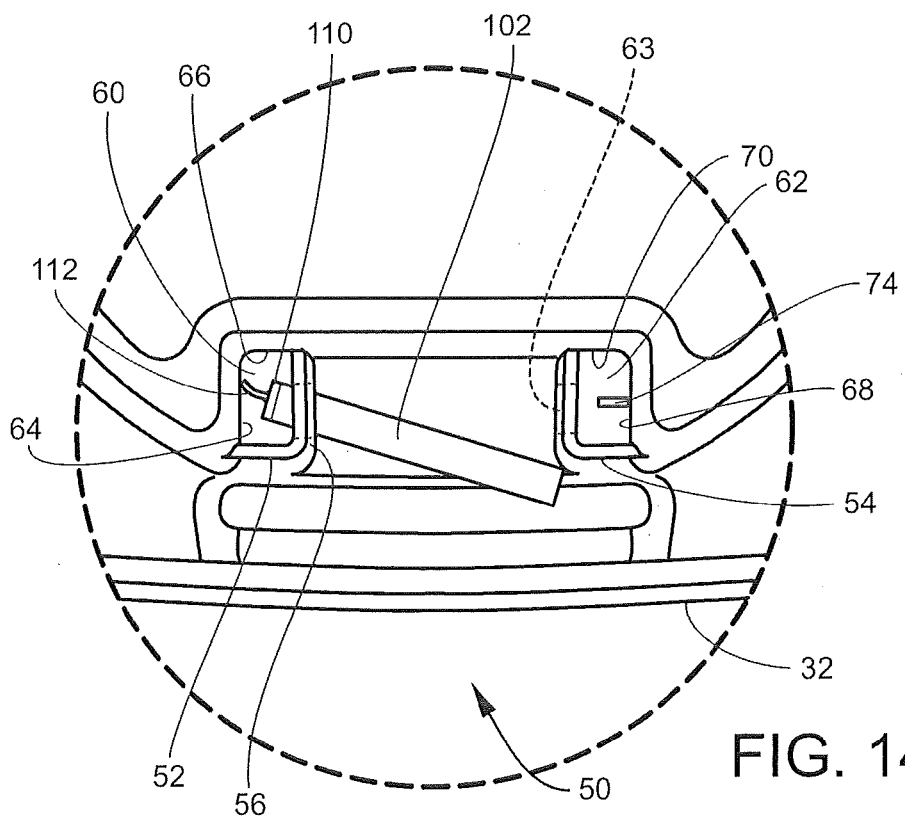
Figure 15:
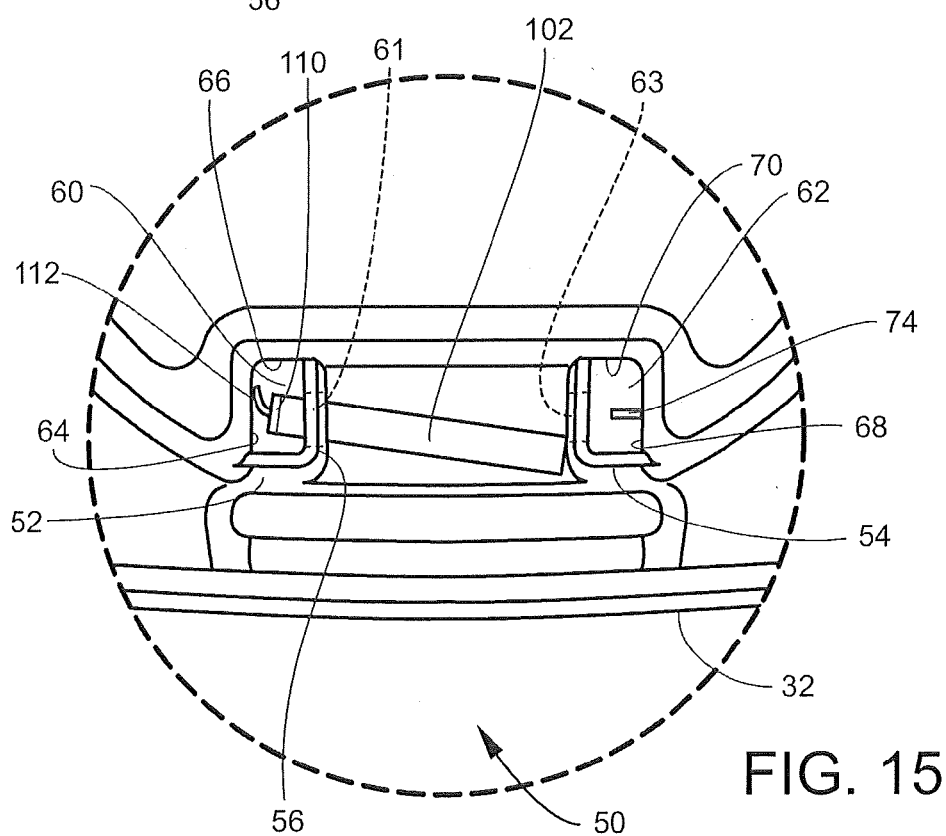
Figure 16:
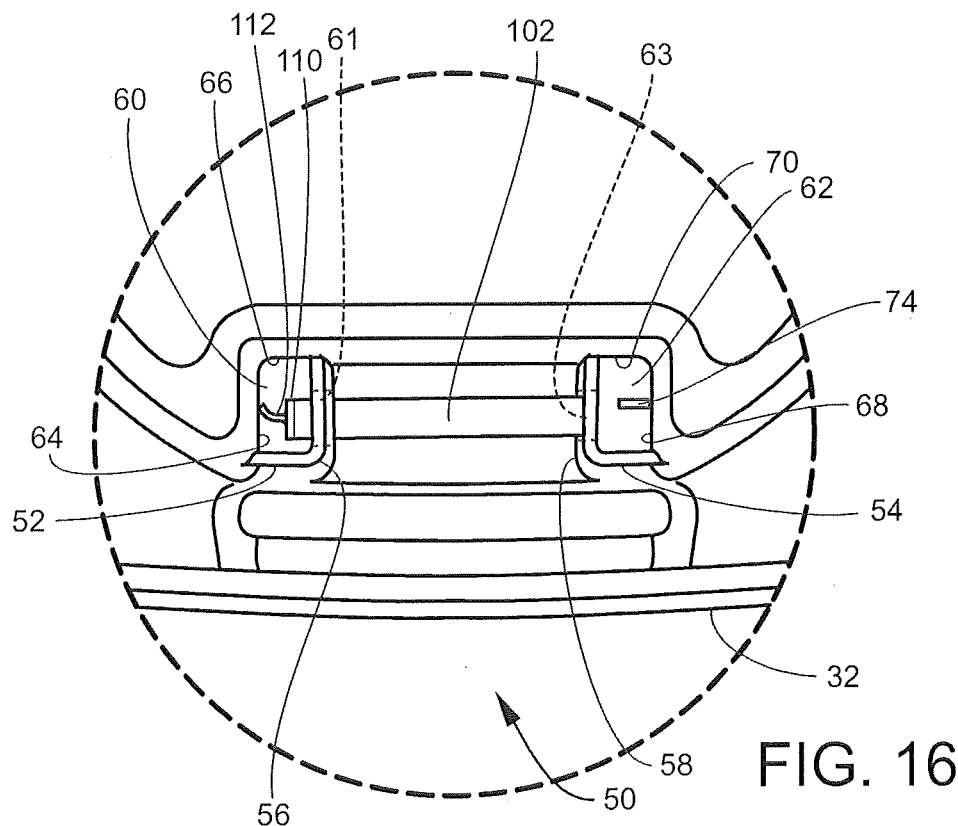
Figure 17:
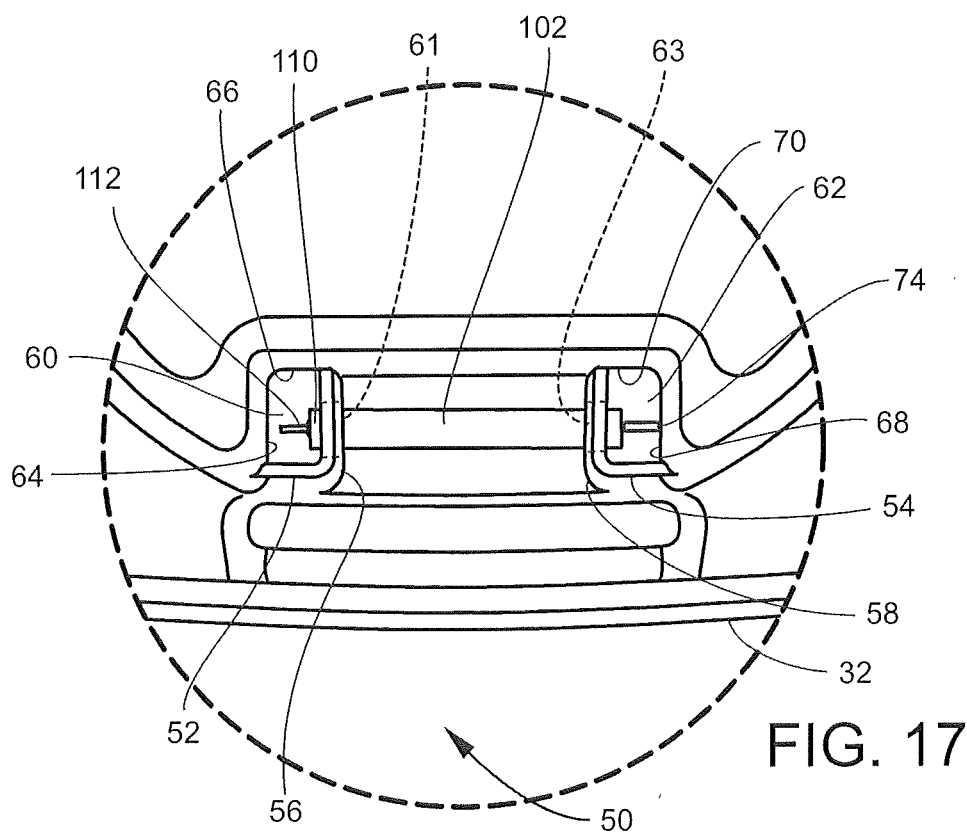
Figure 18:
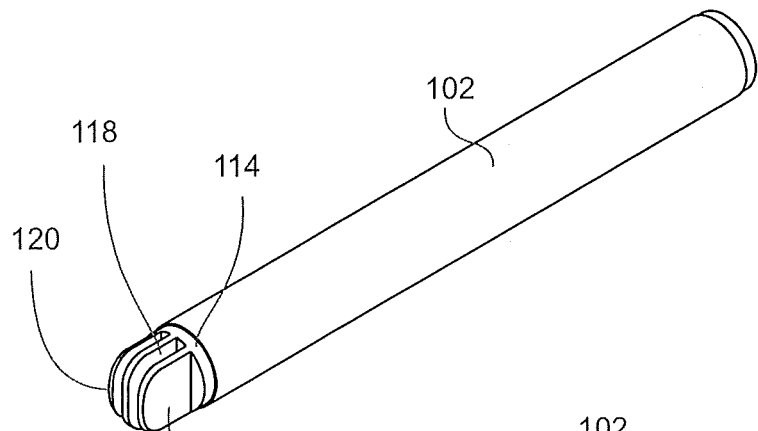
FIGS. 18-23 are fragmentary sequential views of a retention bar according to another preferred embodiment of the present invention being inserted into the retention bar housings of a waste bin of the type shown in FIGS. 4 and 4A.

For example, in FIGS. 12-17, a cap 110 is placed on one end of the retention bar 102. The cap 110 includes an axially-extending protrusion 112, as shown, that is fabricated of natural or synthetic rubber, thermoplastic resin or other material that will deform under pressure and return to its original shape when the pressure is released. As shown in FIG. 13, the retention bar 102 is inserted into aperture 61 at an angle. As the retention bar 102 is further extended into the retention housing 60, the protrusion 112 deforms against the external wall 64, as shown in FIG. 14. As the retention bar 102 is further extended into the retention housing 60, the other end of the retention bar clears the vertical wall 58, as shown in FIG. 15 and can be moved into alignment with the aperture 63 in the vertical wall 58 and the extended into the retention bar housing 62, FIG. 16, until it is stopped from further insertion by the rib 74, as shown in FIG. 17. As shown, the protrusion 112 has returned to its original shape, shown in FIG. 12, and the combined length of the protrusion 112 and the retention bar 102 allow rotation of the retention bar 102 but do not allow the retention bar to be removed under normal operating conditions. To remove the retention bar 102, the sequence shown in FIGS. 12-17 is reversed.

Figure 19:
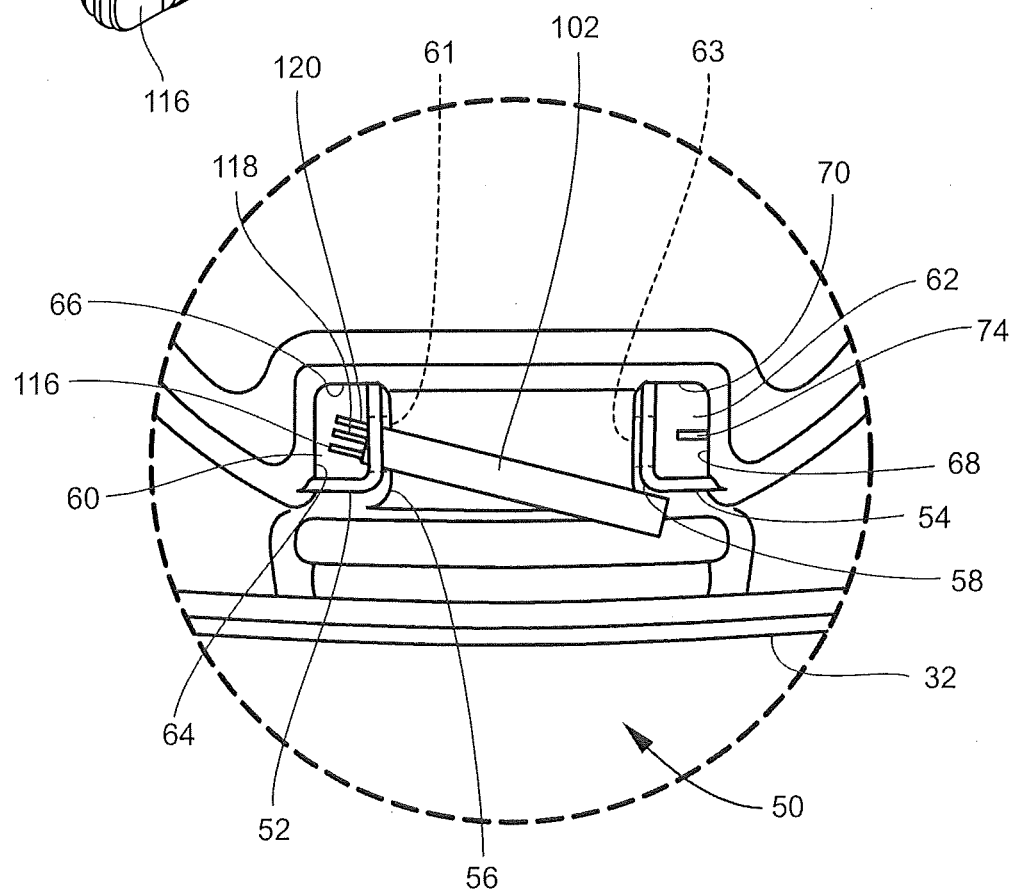
Figure 20:
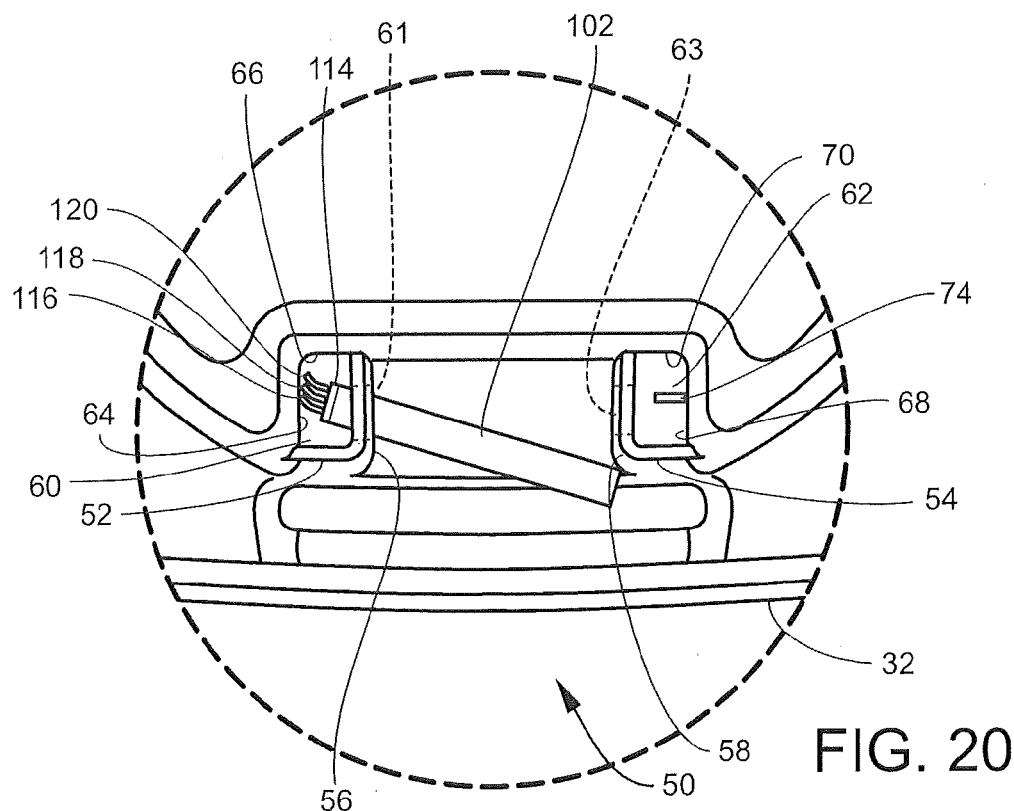
Figure 21:
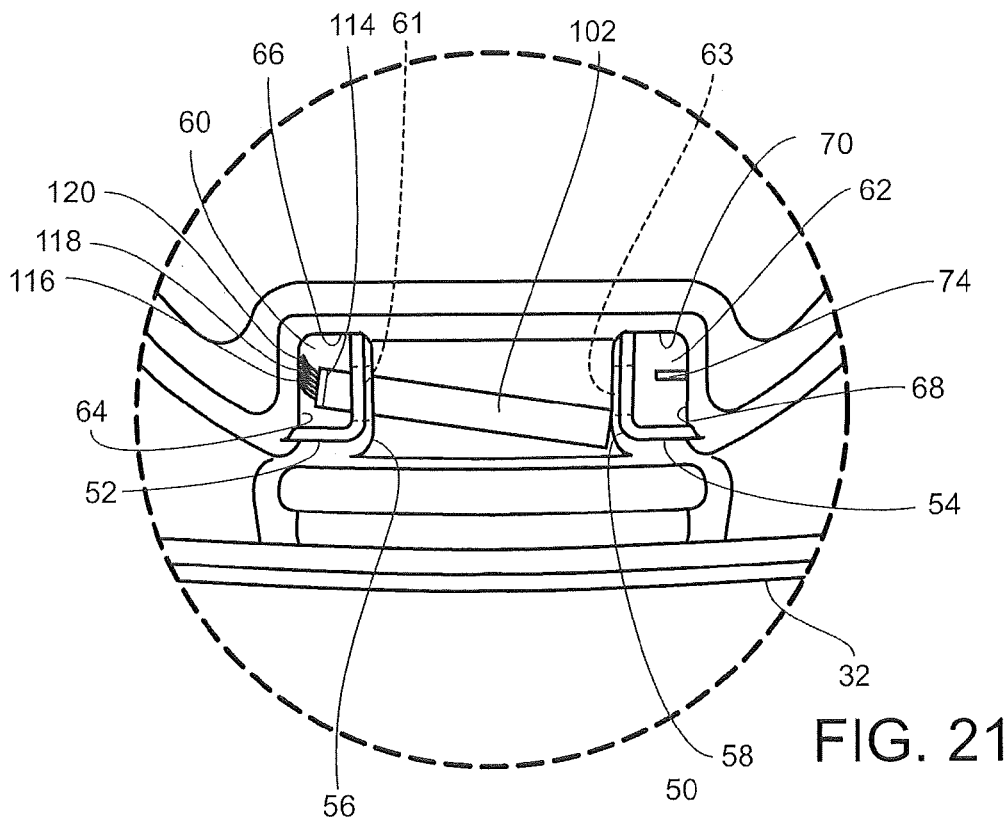
Figure 22:
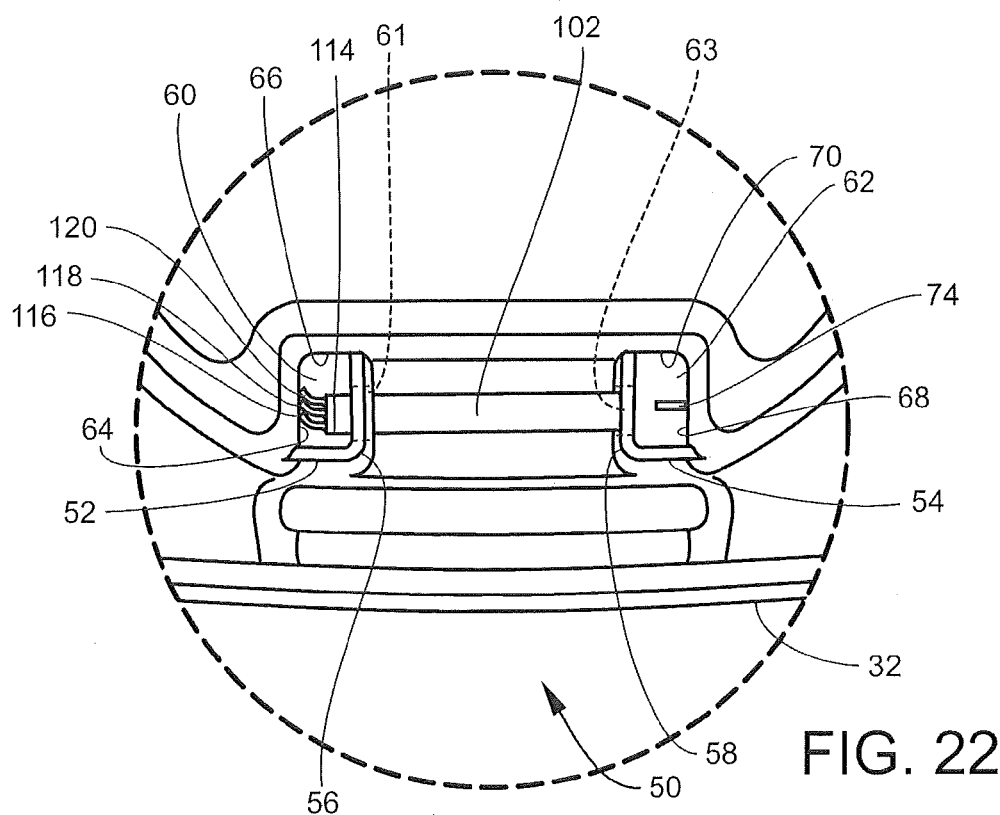
Figure 23:
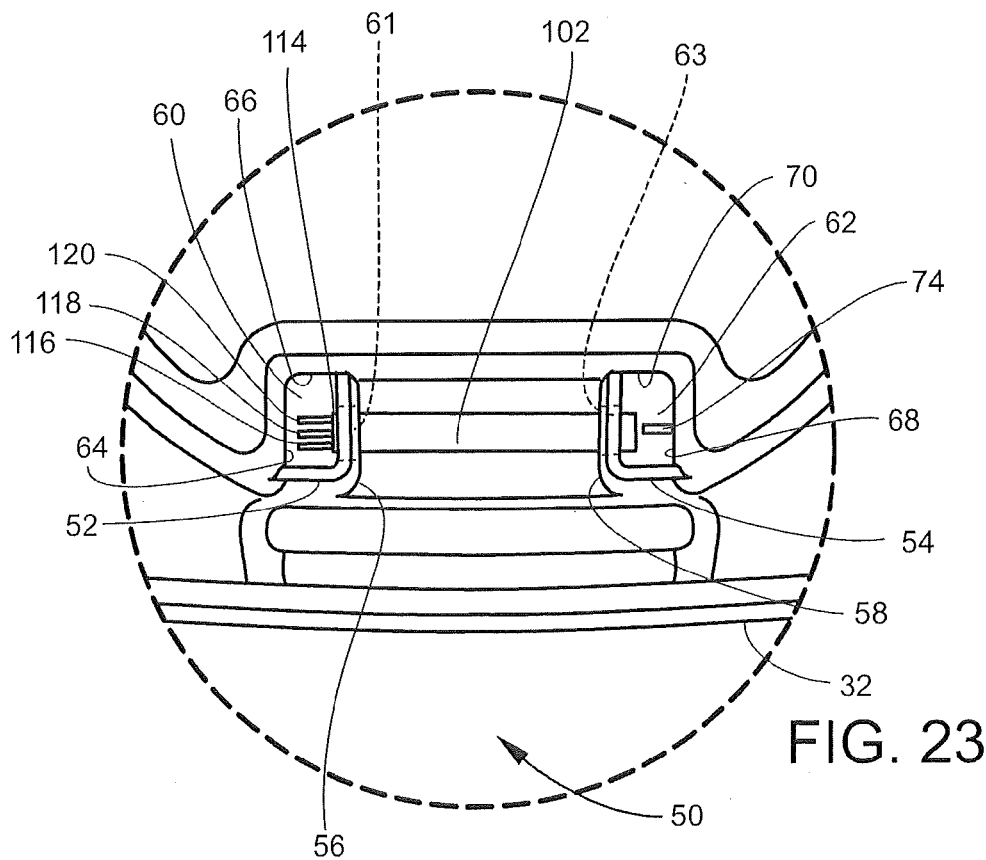

Referring now to FIGS. 18-23, another alternative embodiment is shown. An end cap 114 of the retention bar 102 is provided multiple protrusions 116, 118 and 120 fabricated of natural or synthetic rubber, thermoplastic resin or other material that will deform under pressure and return to its original shape when the pressure is released. The protrusions 116, 118 and 120 collectively deform under pressure to allow the placement of the retention bar 102 through the aperture 61, returning to their original shape when the pressure is relieved, with their original shape and length creating interference with the exterior wall 56 of the retention bar housing 60 that opposes the rib 74. This is shown sequentially in FIGS. 19-23. The retention bar 102 is inserted into aperture 61 at an angle, as shown in FIG. 19. As the retention bar 102 is further extended into the retention housing 60, the protrusions 116, 118, 120 deform against the external wall 64, as shown in FIG. 20. As the retention bar 102 is further extended into the retention housing 60, the other end of the retention bar 102 clears the vertical wall 58, as shown in FIG. 21 and can be moved into alignment with the aperture 63 in the vertical wall 58 and extended into the retention bar housing 62, FIG. 22, until it is stopped from further insertion by the rib 74, as shown in FIG. 23. As shown, the protrusions 116, 118, 120 have each returned to their original shape shown in FIG. 18 and the combined length of the protrusions 116, 118, 120 and the retention bar 102 allow rotation of the retention bar 102 but do not allow the retention bar 102 to be removed under normal operating conditions. To remove the retention bar 102, the sequence shown in FIGS. 19-23 is reversed.

Figure 24:
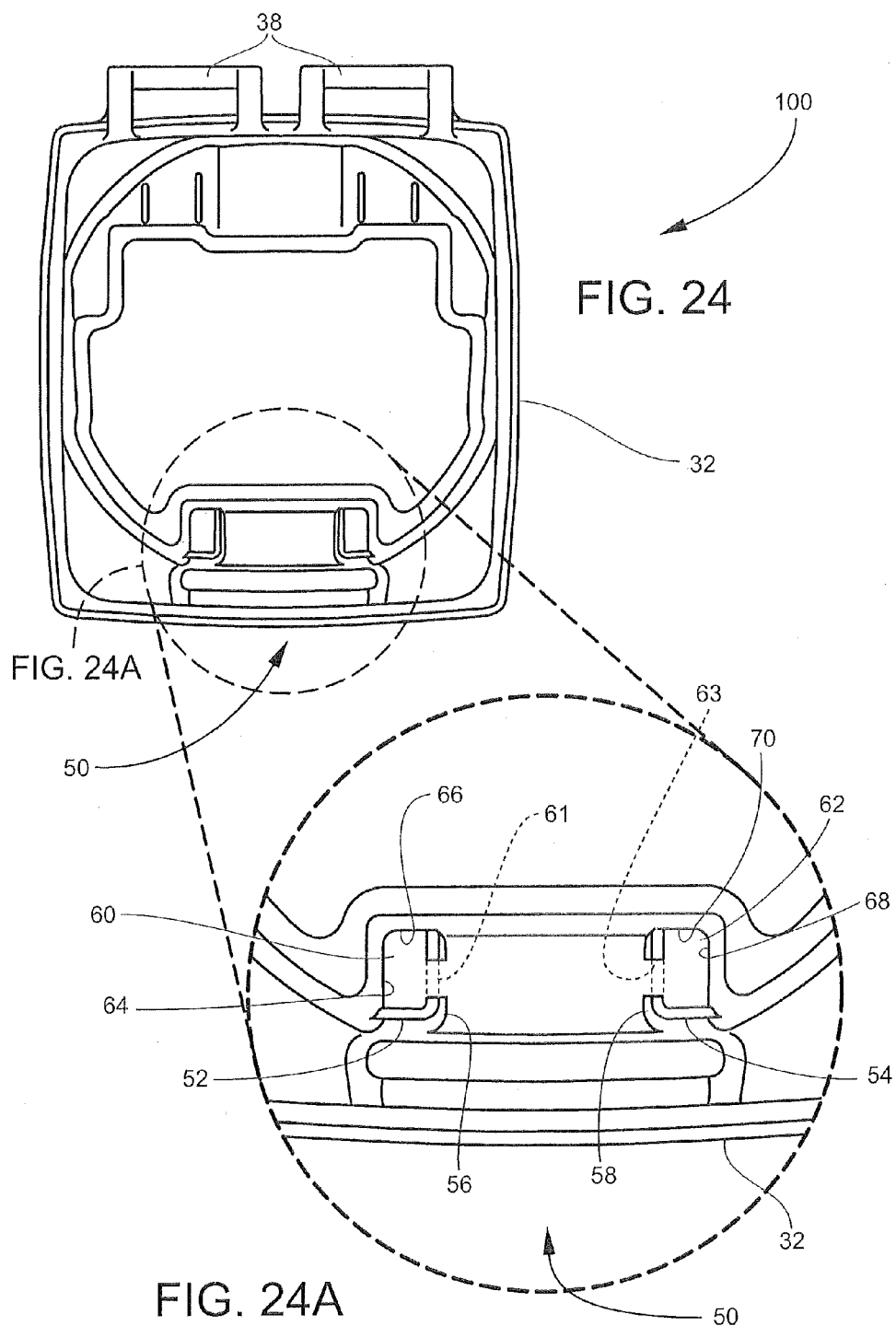
FIG. 24 is a top plan view of a waste bin having a retention bar mechanism according to an alternative preferred embodiment of the present invention.

Referring now to FIGS. 24, 24A, the same essential structure of the waste container 100 as described above is again shown, but with the removal of the rib 74. Instead, the entire interference between the retention bar 102 and the external walls 64 and 68 is created by protrusions on both ends of the retention bar 102, See FIGS. 26-30.

Figure 25:
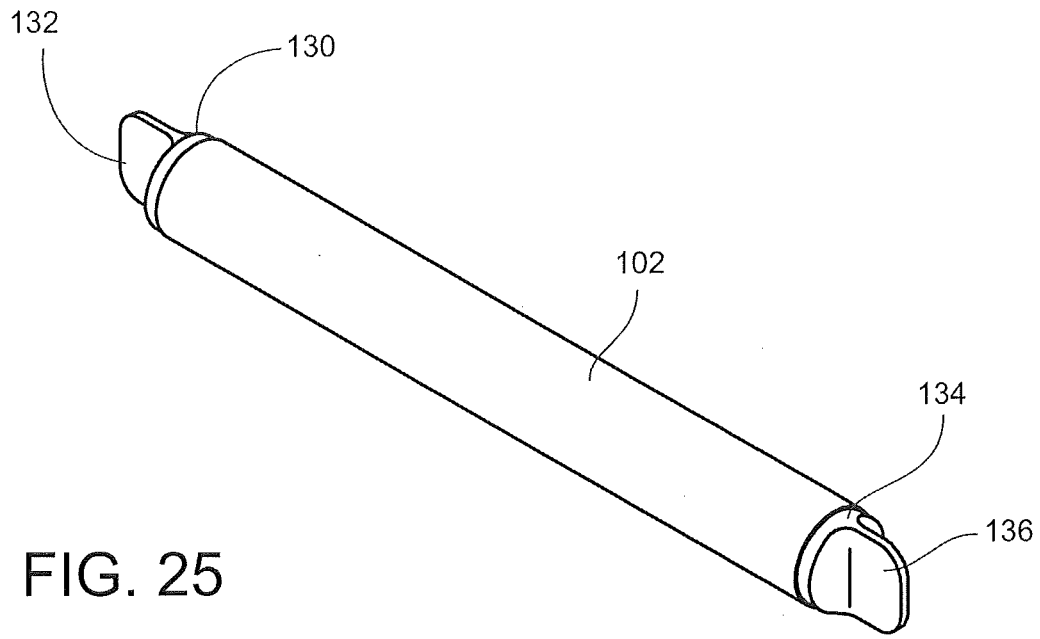
FIGS. 25-30 are fragmentary sequential views of a retention bar according to yet another preferred embodiment of the present invention being inserted into the retention bar housings of a waste bin of the type shown in FIGS. 24 and 24A.

As shown in FIG. 25, a cap 130 is placed on one end of the retention bar 102. The cap 130 includes an axially-extending protrusion 132, as shown, that is fabricated of natural or synthetic rubber, thermoplastic resin or other material that will deform under pressure and return to its original shape when the pressure is released. A cap 134 is placed on the other end of the retention bar 102. As with cap 130, cap 134 includes an axially-extending protrusion 136, as shown, that is fabricated of natural or synthetic rubber, thermoplastic resin or other material that will deform under pressure and return to its original shape when the pressure is released.

Figure 26:
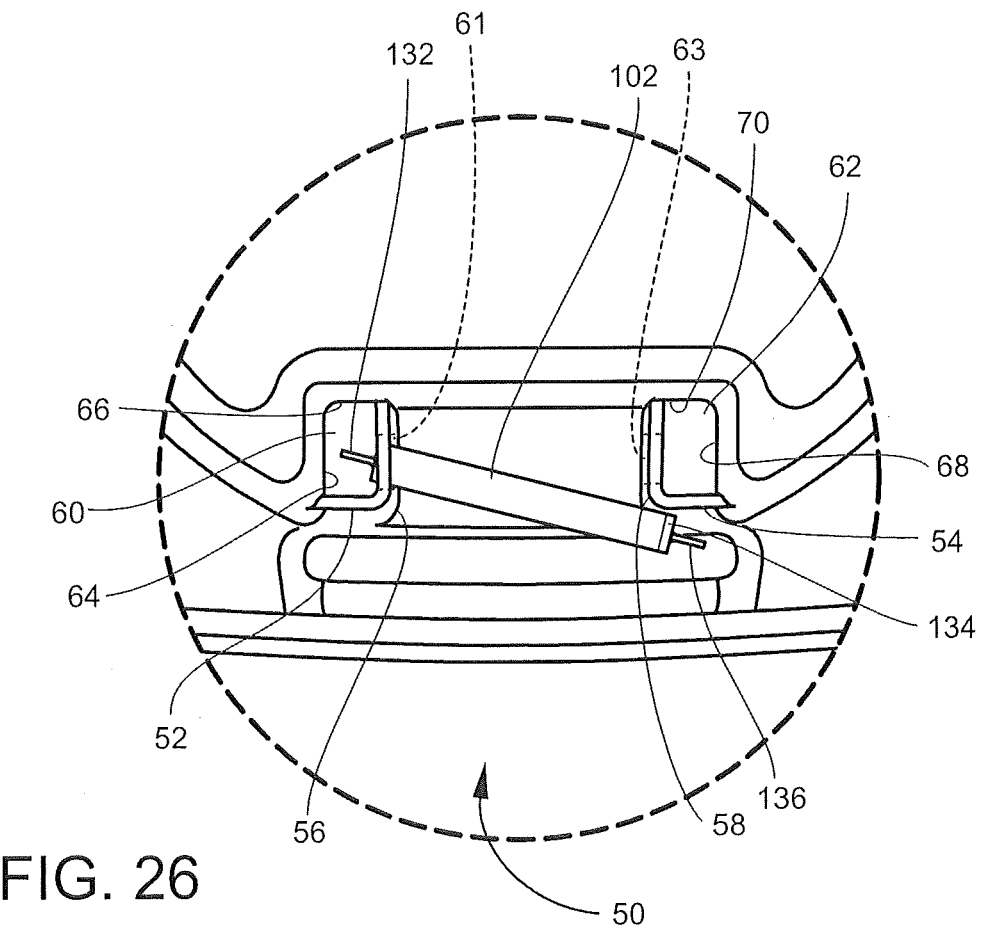
Figure 27:
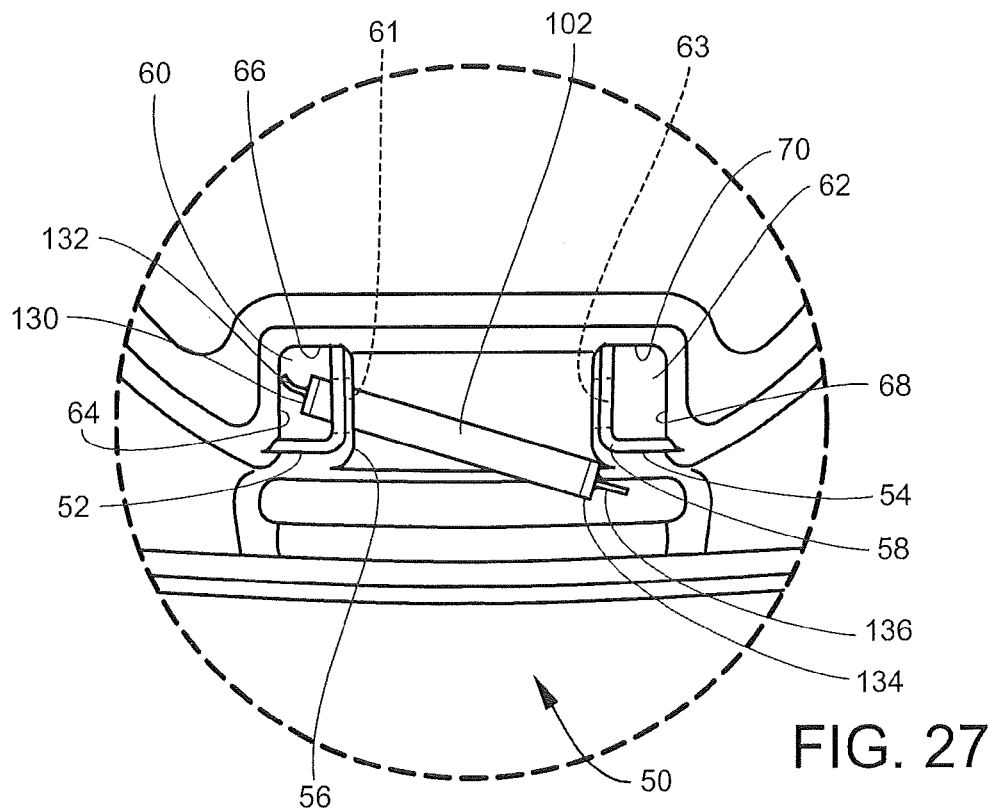
Figure 28:
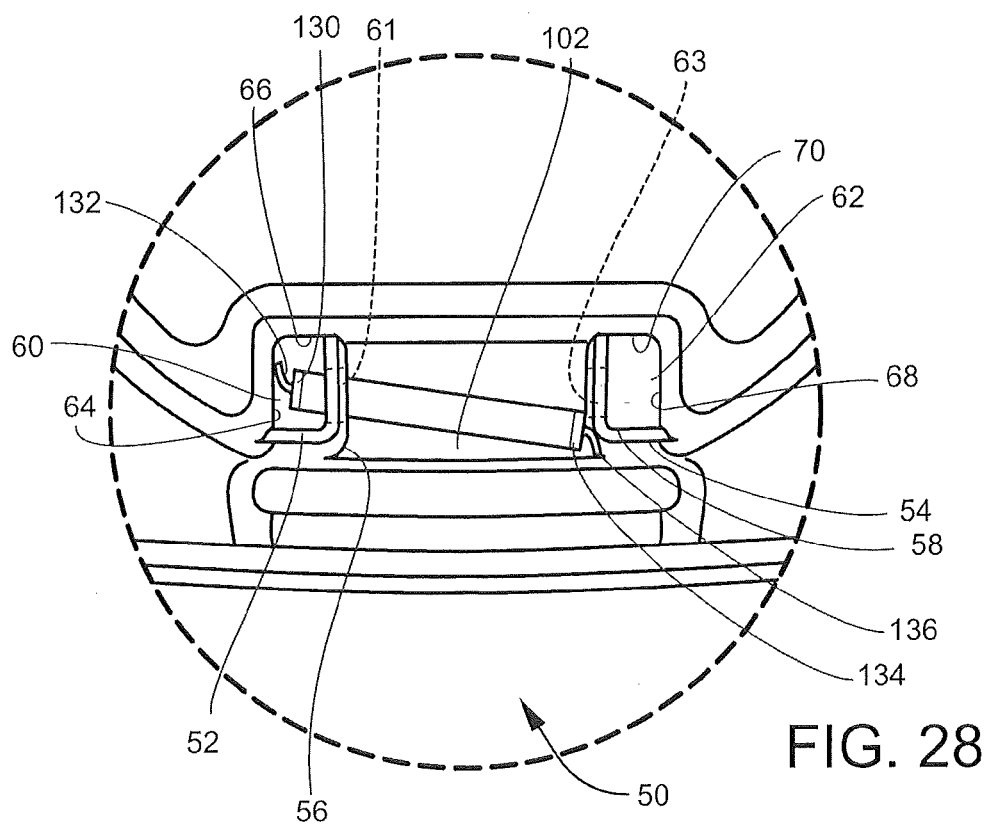
Figure 29:
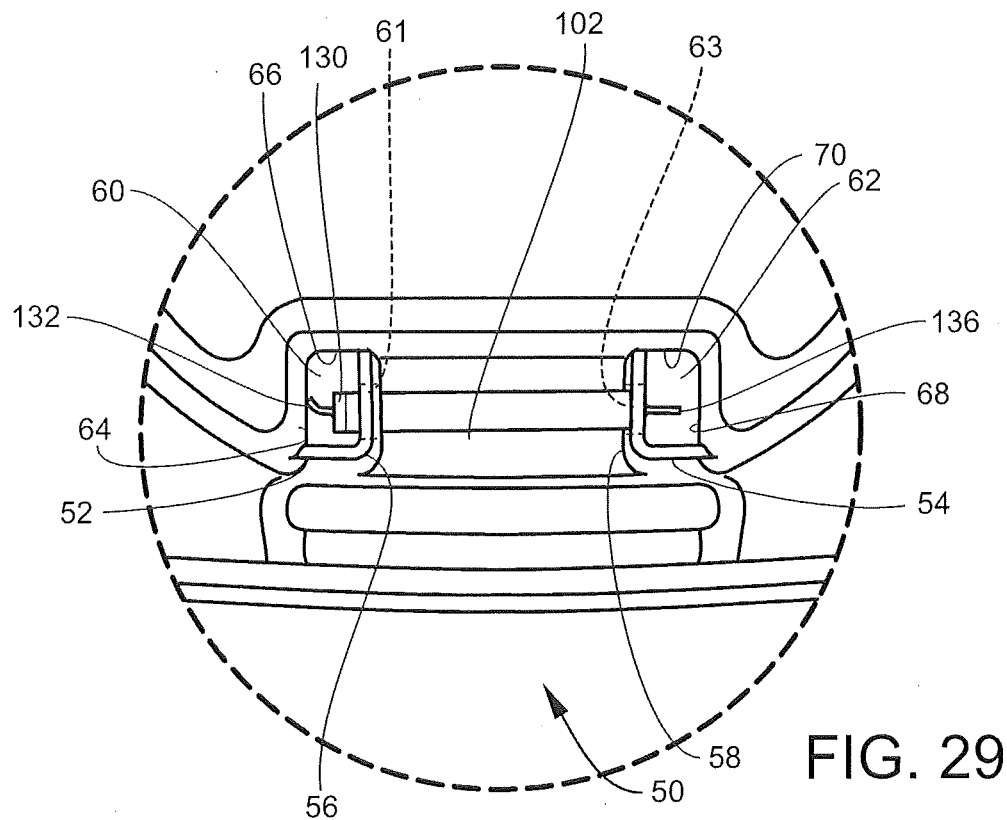

As shown in FIG. 26, the retention bar 102 is inserted into aperture 61 at an angle. As the retention bar 102 is further extended into the retention housing 60, the protrusion 132 deforms against the external wall 64, as shown in FIG. 27. As the retention bar 102 is further extended into the retention housing 60, the protrusion 136 on other end of the retention bar 102 deforms against the vertical wall 58, as shown in FIG. 28. As the deformed protrusion 136 rides up the vertical wall 58 the retention bar 102 moves into alignment with the aperture 63 in the vertical wall 58. The protrusion 136 enters the aperture 63 in the vertical wall 58 and extends into the retention bar housing 62, as shown in FIG. 29.

Figure 30:
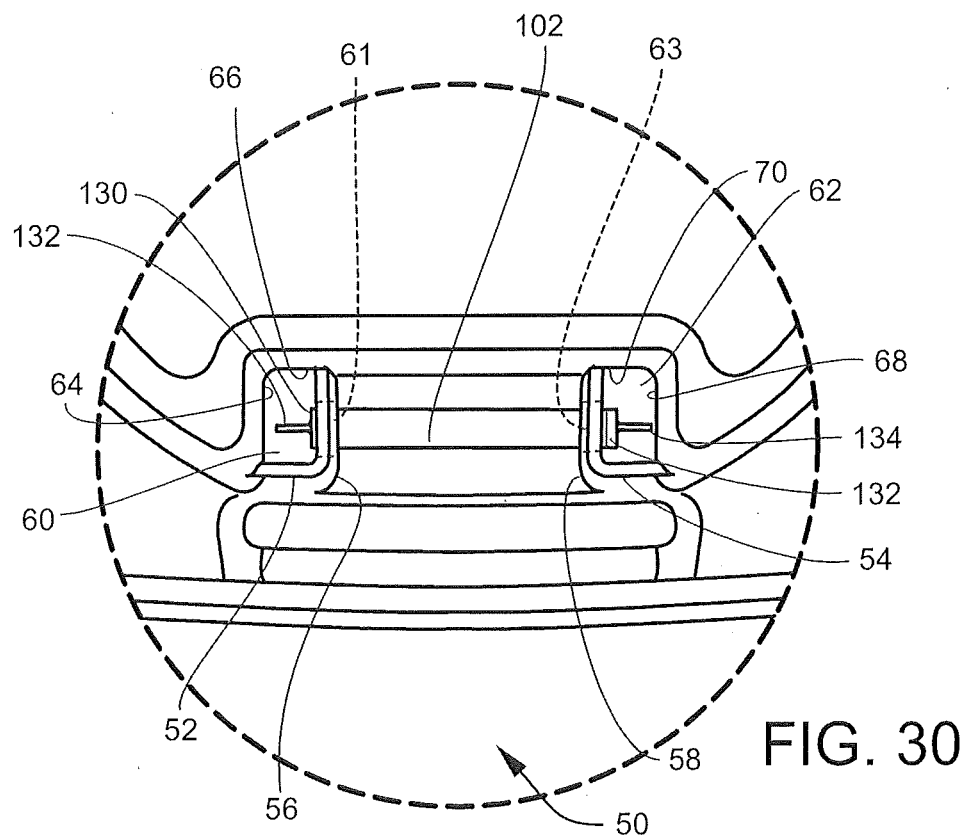

As shown in FIG. 30, the protrusions 132 and 136 have each returned to their original shape, shown in FIG. 25, and the combined length of the protrusions 132, 136 and the retention bar 102 allow rotation of the retention bar 102 but do not allow the retention bar 102 to be removed under normal operating conditions. To remove the retention bar 102, the sequence shown in FIGS. 26-30 is reversed.

Other possible embodiments, not shown, can include but are not limited to snap-fit type mechanisms, either integral to the retention bar 102 or as part of a secondary component added to the retention bar 102, such as spring-released buttons or hooks.

The deformable protrusions described above can be made of one of many materials that are pliable, stiff and retain a memory of their original shape. The aspect ratio of the protrusions' shape, i.e., the thickness-to-height ratio, is such that their pliability is accentuated with transverse force application to the wide faces of the protrusions but their stiffness resists axially-directed forces. The deformability is most evident when bending a protrusion while positioning the retention bar 102. The protrusions act as a cantilever, and can be deformed by a transverse force applied perpendicular to its wide face, either on its tip or on its body. This is the bending which occurs when the protrusion comes in contact with the relatively immovable walls 64 and 68 of the retention bar housings 60 and 62. This momentary deformation will not cause stress beyond the yield point of the material, therefore allowing the protrusion to return to its original shape when the retention bar 102 is in its final position and there are no longer transverse forces being exerted.

Once the retention bar 102 is in place, the only forces that the protrusions may be subjected to are axial forces caused by side-to-side forces on the retention bar 102 itself. The tapered shape of the protrusions creates stiffness in this axial direction which will resist bending and collapsing. However, it must be noted that during its normal function with automated lifters, there are minimal side-to-side forces exerted on the retention bar 102. Because of the protected location of the retention bar 102 on the body of the roll-out waste cart, it would be difficult to purposefully exert any substantial axial forces on the retention bar 102.

A lift mechanism for a roll-out waste bin according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A roll-out waste bin of the type characterized by having a receptacle mounted on wheels, a hinged lid enclosing an open top of the receptacle, a handle, a downward lip along a front top rim of the receptacle and a vertically spaced retention bar for being grasped by an external lifter for elevating and emptying the contents from the receptacle, and including:

(a) first and second laterally spaced-apart vertical walls extending outwardly and forwardly from a forward side of the receptacle, and positioned to form respective first and second retention bar housings;

(b) a first aperture formed in the first vertical wall and a second aperture formed in the second vertical wall for receiving the retention bar, the first and second apertures having diameters sufficiently large to permit rotation of the retention bar in the first and second apertures;

(c) a rib positioned in the first retention bar housing and adapted to abut a first end of the retention bar extending into the first retention bar housing to prevent movement of the retention bar into the first retention bar housing beyond a predetermined point; and (d) an axially-extending, radially-deformable protrusion carried on a second end of the retention bar and adapted to reside in and engage a wall of the second retention bar housing to deform against the wall such that the first end of the retention bar clears the first vertical wall and can be moved into alignment with the first aperture to extend into the first retention bar housing, and to restrain side-to-side movement of the retention bar out of the first and second apertures.

2. The roll-out waste bin according to claim 1, wherein the rib comprises an integrally-formed elongate member that is adapted to engage an end face of the retention bar.

3. The roll-out waste bin according to claim 1, wherein the retention bar is cylindrical and the first aperture and the second aperture are circular.

4. The roll-out waste bin according to claim 1, wherein the first and second retention bar housings each comprise one vertical wall, one front closeout wall and two external walls of the waste bin receptacle.

5. The roll-out waste bin according to claim 1, wherein the axially-extending, radially-deformable protrusion is positioned on an end face of the retention bar to prevent passage of the retention bar further through the second aperture into the second retention bar housing.

6. The roll-out waste bin according to claim 1, wherein the radially-deformable protrusion comprises a flange extending axially from the second end of the retention bar.

7. The roll-out waste bin according to claim 1, wherein the axially-extending, radially-deformable protrusion comprises a plurality of spaced-apart radially-deformable flanges having a width that is a major portion of the diameter of the retention bar and a thickness that is a minor portion of the diameter of the retention bar.

8. A roll-out waste bin of the type characterized by having a receptacle mounted on wheels, a hinged lid enclosing an open top of the receptacle, a handle, a downward lip along a front top rim of the receptacle and a vertically spaced retention bar for being grasped by an external lifter for elevating and emptying the contents from the receptacle, and including:

(a) first and second laterally spaced-apart vertical walls extending outwardly and forwardly from a forward side of the receptacle, and positioned to form respective first and second retention bar housings;

(b) a first aperture formed in the first vertical wall and a second aperture formed in the second vertical wall for receiving the retention bar, the first and second apertures having diameters sufficiently large to permit rotation of the retention bar in the first and second apertures;

(c) a first deformable protrusion carried on a first end of the retention bar and adapted to reside in and engage a wall of the first retention bar housing;

(d) a second axially-extending, radially-deformable protrusion carried on a second end of the retention bar and adapted to reside in and engage a wall of the second retention bar housing to deform against the wall such that the first end of the retention bar clears the first vertical wall and can be moved into alignment with the first aperture to extend into the first retention bar housing, and cooperating with the first deformable protrusion to restrain side-to-side movement of the retention bar out of the first and second apertures.

9. The roll-out waste bin according to claim 8, wherein the first deformable protrusion and the second axially-extending, radially-deformable protrusion comprise first and second deformable flanges extending axially from respective first and second ends of the retention bar.

10. The roll-out waste bin according to claim 8, wherein the first deformable protrusion and the second axially-extending, radially-deformable protrusion each comprise a deformable flange having a width that is a major portion of the diameter of the retention bar and a thickness that is a minor portion of diameter of the retention bar, and which extend axially from respective first and second ends of the retention bar.

11. The roll-out waste bin according to claim 8, wherein the combined length of the retention bar, the first second axially-extending, radially- deformable protrusion and the second axially-extending, radially-deformable protrusion is longer than the distance between the first and second vertical walls and shorter than the distance between opposed external walls of the waste bin receptacle.

12. A method of installing a retention bar onto a roll-out waste bin of the type characterized by having a receptacle mounted on wheels, a hinged lid enclosing an open top of the receptacle, a handle, a downward lip along a front top rim of the receptacle wherein the retention bar is spaced vertically from the lip for being grasped by an external lifter for elevating and emptying the contents from the receptacle, comprising the steps of:

(a) providing first and second laterally spaced-apart vertical walls extending outwardly and forwardly from a forward side of the receptacle, and positioned to form respective first and second retention bar housings;

(b) providing a first aperture formed in the first vertical wall and a second aperture formed in the second vertical wall for receiving the retention bar, the first and second apertures having respective diameters sufficiently large to permit rotation of the retention bar in the first and second apertures;

(c) providing a axially-extending, radially-deformable protrusion carried on one end of the retention bar;

(d) inserting the retention bar into and through the second aperture into the second retention bar housing to a point where the axially-extending, radially-deformable protrusion on the end of retention bar radially deforms and allows the retention bar to be moved into alignment with the first and second apertures; and (e) moving the retention bar axially out of the second retention bar housing a sufficient distance to cause the radially-deformed protrusion to return to the axially-extending, non-radially-deformed position.

13. The method according to claim 12, and including the steps of providing a rib projecting from an external wall of the first retention bar housing, and extending the retention bar into the first aperture and into the first retention bar housing to abut the rib; and providing a second axially-extending, radially-deformable protrusion on a second end of the retention bar positioned in the second retention bar housing in a radially-undeformed position to restrain side-to-side movement of the retention bar out of the first and second apertures.

14. The method according to claim 13, wherein the first axially-extending, radially-deformable protrusion and the second axially-extending, radially-deformable protrusion each comprise a deformable flange having a width that is a major portion of the diameter of the retention bar and a thickness that is a minor portion of diameter of the retention bar.

* * * * *